(12) United States Patent
Zhang (10) Patent No.: US 12,513,078 B2
(45) Date of Patent: Dec. 30, 2025

(54) BIT INDEX EXPLICIT REPLICATION (BIER) ADVERTISING WITH A ROUTE DISTINGUISHER

(71) Applicant: Juniper Networks, Inc., Sunnyvale, CA (US)

(72) Inventor: Zhaohui Zhang, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 448 days.

(21) Appl. No.: 18/069,600

(22) Filed: Dec. 21, 2022

(65) Prior Publication Data

US 2024/0015096 A1   Jan. 11, 2024

Related U.S. Application Data

(60) Provisional application No. 63/367,862, filed on Jul. 7, 2022.

(51) Int. Cl.
*H04L 45/16* (2022.01)
*H04L 45/02* (2022.01)
*H04L 45/745* (2022.01)

(52) U.S. Cl.
CPC .............. *H04L 45/16* (2013.01); *H04L 45/04* (2013.01); *H04L 45/745* (2013.01)

(58) Field of Classification Search
None
See application file for complete search history.

(56) References Cited

U.S. PATENT DOCUMENTS

| | | | | |
|---|---|---|---|---|
| 11,483,237 B2* | 10/2022 | Dutta | ...................... | H04L 45/50 |
| 11,929,923 B2* | 3/2024 | Duan | ...................... | H04L 45/42 |
| 2017/0033939 A1* | 2/2017 | Bragg | ...................... | H04L 12/18 |
| 2018/0367456 A1* | 12/2018 | Wijnands | .............. | H04L 45/745 |

(Continued)

FOREIGN PATENT DOCUMENTS

| | | |
|---|---|---|
| EP | 4131872 A1 | 2/2023 |
| WO | 2021196717 A1 | 10/2021 |

OTHER PUBLICATIONS

Extended European Search Report for Application No. EP23156305, mailed on May 25, 2023, 13 pages.

(Continued)

*Primary Examiner* — Xavier S Wong (74) *Attorney, Agent, or Firm* — Harrity & Harrity, LLP (57) ABSTRACT

In some implementations, a network device may determine a route distinguisher (RD) that is associated with a bit index explicit replication (BIER) domain, wherein the network device participates in the BIER domain and one or more BIER sub-domains of the BIER domain. The network device may identify BIER sub-domain information associated with a BIER sub-domain of the one or more BIER sub-domains of the BIER domain. The network device may identify proxy information that is associated with the BIER sub-domain. The network device may send an advertisement that includes a BIER prefix of the network device, the BIER sub-domain information, the RD, and the proxy information. Sending the advertisement is to permit a receiving network device to store the proxy information in a bit index forwarding table (BIFT) of the receiving network device.

20 Claims, 9 Drawing Sheets

(56) References Cited

U.S. PATENT DOCUMENTS

| | | | |
|---|---|---|---|
| 2020/0245206 A1* | 7/2020 | Allan | H04L 45/04 |
| 2023/0269165 A1* | 8/2023 | Xie | H04L 45/34 |
| | | | 370/389 |

OTHER PUBLICATIONS

Zhang Z., "Multicast/BIER as a Service draft-zzhang-bier-multicast-as-a-service-04; draft-zzhang-bier-multicast-as-a-service-04.txt," May 2022, pp. 1-14, XP015152385, Retrieved from the Internet: [URL:https://tools.ietf.org/html/draft-zzhang-bier-multicast-as-a-service-04].

* cited by examiner

BIT INDEX EXPLICIT REPLICATION (BIER) ADVERTISING WITH A ROUTE DISTINGUISHER

CROSS-REFERENCE TO RELATED APPLICATION

This application claims priority to U.S. Provisional Patent Application No. 63/367,862, entitled "Bit Index Explicit Replication (BIER) Virtual Private Network (VPN)," and filed on Jul. 7, 2022. The entire content of the above-referenced application is expressly incorporated herein by reference.

BACKGROUND

Bit Index Explicit Replication (BIER) provides a simple and scalable solution for large scale multicast deployment, independent of the number of multicast flows.

SUMMARY

In some implementations, a method includes determining, by a network device, a route distinguisher (RD) that is associated with a BIER domain, wherein the network device participates in the BIER domain and one or more BIER sub-domains of the BIER domain; identifying, by the network device, BIER sub-domain information associated with a BIER sub-domain of the one or more BIER sub-domains of the BIER domain; identifying, by the network device, proxy information that is associated with the BIER sub-domain; and sending, by the network device, an advertisement that includes a BIER prefix of the network device, the BIER sub-domain information, the RD, and the proxy information.

In some implementations, a method includes receiving, by a network device and from a sending network device associated with a BIER domain, an advertisement that includes a BIER prefix of the sending network device, BIER sub-domain information, an RD associated with the BIER domain, and proxy information; and computing, by the network device, a bit index forwarding table (BIFT) for a BIER sub-domain of the BIER domain.

In some implementations, a network device includes one or more memories, and one or more processors to: receive, from a sending network device associated with a BIER domain, an advertisement that includes BIER sub-domain information associated with a BIER sub-domain of the BIER domain, and an RD associated with the BIER domain, and proxy information that is associated with the BIER sub-domain; and compute a BIFT for the BIER sub-domain.

DETAILED DESCRIPTION

The following detailed description of example implementations refers to the accompanying drawings. The same reference numbers in different drawings may identify the same or similar elements.

BIER is an architecture for multicast data forwarding in a network. It allows a multicast data packet to be replicated and sent over multiple paths in a network without the need for intermediate network devices (e.g., routers) to maintain multicast routing tables or the use of a multicast protocol, such as protocol independent multicast (PIM) or multicast source discovery protocol (MSDP).

A BIER domain is a network or portion of a network that uses the BIER architecture for multicast forwarding. A BIER domain comprises interconnected BIER-capable network devices. The BIER domain can include, for example, a BRF (e.g., a router that supports BIER and that has a BFR prefix, and, optionally, a BIER identifier (BIER ID)). A BRF can be a bit forwarding ingress router (BFIR) (e.g., a provider edge (PE) network device in a BIER domain that adds a BIER header to a multicast packet entering the BIER domain, and forwards the multicast packet within the BIER domain), a bit forwarding egress router (BFER) (e.g., a PE network device that removes the BIER header from the multicast packet before forwarding the multicast packet from the BIER domain), and/or a transit BFR (e.g., a network device in the BIER domain that forwards multicast packets with BIER headers within the BIER domain). The BIER domain can include one or more BIER sub-domains, where each sub-domain is a portion of the BIER domain that includes at least some of the network devices of the BIER domain. Each sub-domain can include one or more sets, where each includes network devices of the sub-domain at least some of the network device of the sub-domain.

In a typical BIER domain, a BRF sends an advertisement that identifies its BIER prefix (which is associated with the BIER domain), a sub-domain identifier (e.g., that indicates a sub-domain of the BIER in which the BRF participates), and a list of other BRFs that participate in the sub-domain. However, this is problematic when a BIER domain is spread over a provider network, such that BRFs associated with the BIER domain and/or the sub-domain are not all directly connected to each other. In such a case, additional BIER information can be shared (e.g., BIER prefixes of the BRFs of the BIER domain) with the provider network (e.g., to enable a receiving network device to distinguish between sub-domains of the BIER domain and other BIER domains). This requires additional consumption of computing resources (e.g., processing resources, memory resources, communication resources, and/or power resources, among other examples) of the BRF and other receiving network devices to ensure that the additional BIER information is shared. Further, when the BIER domain is associated with a virtual private network (VPN) (e.g., the BIER domain is a BIER VPN), additional BIER information cannot be shared with the provider network (e.g., to ensure security and/or integrity of the VPN). Consequently, BIER VPNs have not been employed for a distributed BIER domain.

Some implementations described herein provide a network device (e.g., a PE network device) that participates in a BIER domain and one or more or BIER sub-domains of the BIER domain. The BIER domain may be associated with a VPN and may have one or more sites (e.g., may be distributed).

In some implementations, the network device sends an advertisement that includes a BIER prefix of the network device, BIER sub-domain information (e.g., that indicates a BIER sub-domain of the BIER domain), an RD that is associated with the BIER domain, and proxy information (e.g., that indicates BFR identifiers (BFR-IDs) of one or more BFRs in the BIER sub-domain). The BIER sub-domain information and the RD may uniquely identify the BIER sub-domain to another network device (e.g., a provider (P) network device) of a network, such as a provider network, that receives the advertisement and does not participate in the BIER domain. For example, when the sub-domain information includes an identifier associated with the BIER sub-domain (sub-domain-ID), a sub-domain-ID, RD tuple may identify BIER sub-domain.

Accordingly, in some implementations, the other network device may compute a BFT that is associated with the sub-domain information and the RD (e.g., a BFT keyed to the sub-domain-ID, RD tuple). The other network device then may store the proxy information in the BFT (e.g., store each BFR-ID indicated by the proxy information in an entry of the BFT). The other network device then may use the BFT to route traffic (e.g., BIER traffic or BIER VPN traffic) between different sites of the BIER domain.

In this way, some implementations described herein enable a PE network device associated with a BIER domain to provide, to a P network device associated with a network, an advertisement that includes information that uniquely identifies a sub-domain of the BIER domain (e.g., with respect to other sub-domains of the BIER domain, as well as sub-domains of other BIER domains). Accordingly, the P network device may compute a BIFT for the sub-domain of the BIER domain to enable communication of BIER traffic (or BIER VPN traffic) between PE network devices (e.g., that are associated with different sites of the BIER domain) over the network (e.g., via the P network device and/or one or more P network devices of the network). In this way, additional BIER information (e.g., as described above) does not need to be shared with the P network device (or other P network devices of the network). This thereby conserves computing resources (e.g., processing resources, memory resources, communication resources, and/or power resources, among other examples) that would otherwise have been consumed to provide and process the additional BIER information. Moreover, sensitive BIER information does not need to be shared with the network (e.g., with the P network device and/or one or more P network devices of the network) to support a distributed BIER domain, which enables BIER VPN to be employed (e.g., because security and/or integrity of the VPN is ensured).

FIGS. 1A-1D are diagrams of one or more example implementations 100 described herein. As shown in FIGS. 1A-1D, example implementation(s) 100 may include a plurality of PE network devices (shown as PE network devices PE 1 and PE 2) and/or one or more P devices (shown as P network devices P 1 through P N, where N≥1), which are described in more detail below in connection with FIGS. 2-4.

In some implementations, the plurality of PE network devices may be associated with a BIER domain, which may be associated with a VPN (e.g., the BIER domain may be a BIER VPN). For example, as shown in FIGS. 1A-1D, the PE network device PE 1 may be associated with a site 1 of the BIER domain and the PE network device PE 2 may be associated with a site 2 of the BIER domain. In this way, each of the plurality of PE network devices may be a BRF (e.g., a BFIR, a BFER, and/or a transit BFR) of the BIER domain. Site 1 and Site 2 may be separated from each other (e.g., physically and/or logically separated), such that Site 1 and Site 2 are connected by a network that comprises the one or more P devices. For example, the BIER domain may be a customer BIER domain, and the network may be a provider network (e.g., that provides network services for the customer BIER). Accordingly, the plurality of PE network devices may be customer network devices that communicate with the P network devices of the network (that are also provider network devices).

The BIER domain may include one or more sub-domains (also referred to herein as BIER sub-domains), and each sub-domain may include one or more sets. The plurality of PE network devices may participate in the BIER domain and at least one sub-domain of the one or more sub-domains (e.g., the plurality of PE network devices may be BRFs for the BIER domain and the at least one sub-domain). In some implementations, when a sub-domain of the at least one sub-domain includes one or more sets, the plurality of PE network devices may also participate in the one or more sets.

Figure 1A:
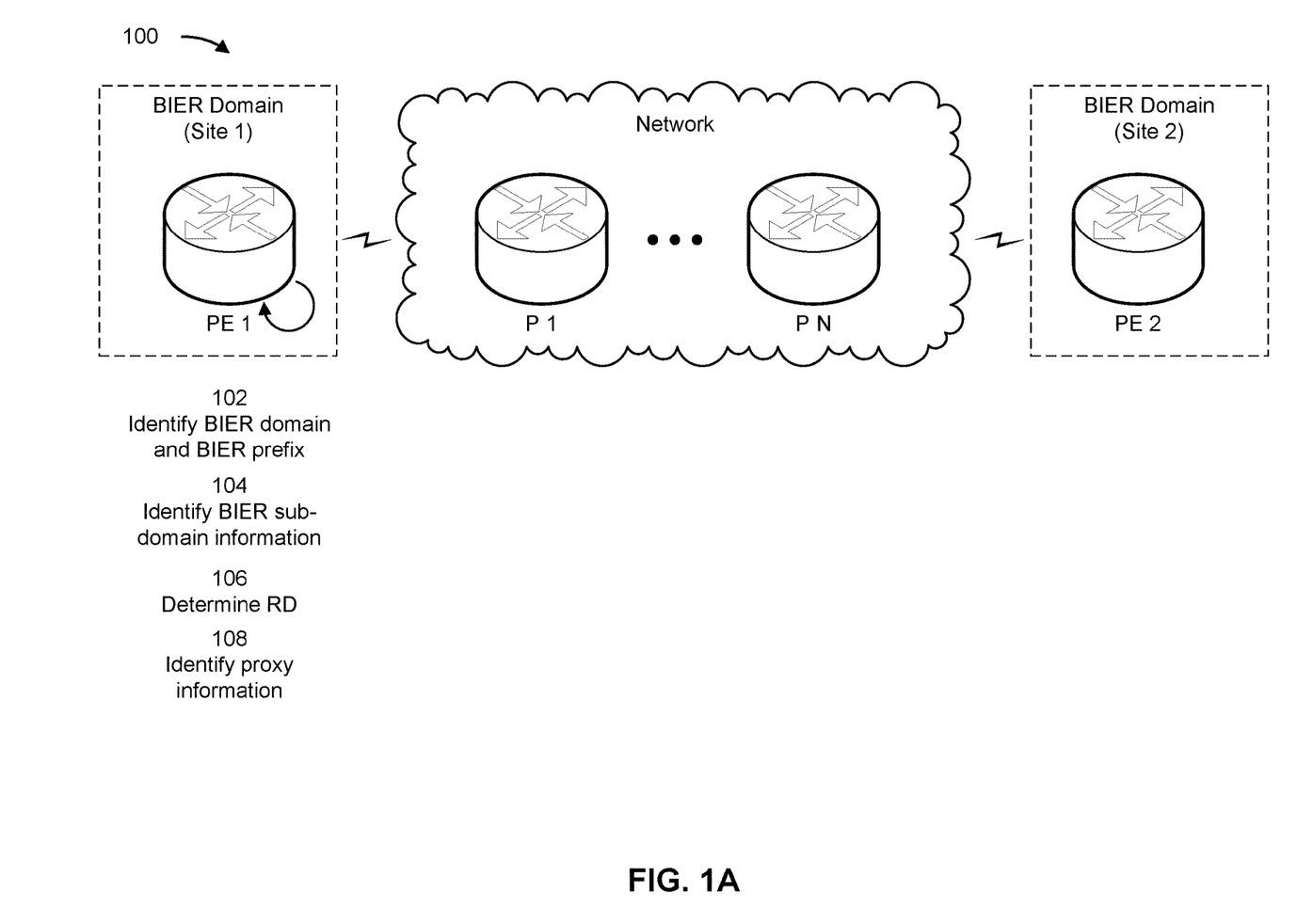
FIGS. 1A-1D are diagrams of one or more example implementations described herein.

As shown in FIG. 1A, and by reference number 102, the PE network device PE 1 may identify the BIER domain and a BIER prefix (e.g., a loopback address of the PE network device PE 1 within the BIER domain) of the PE network device PE 1 (e.g., that is associated with the BIER domain). For example, the PE network device PE 1 may process (e.g., parse and/or read) configuration information of the PE network device PE 1 to identify the BIER domain and/or that the PE network device PE 1 participates in the BIER domain, and/or the BIER prefix of the PE network device PE 1.

As shown by reference number 104, the PE network device PE 1 may identify BIER sub-domain information associated with a BIER sub-domain of the one or more BIER sub-domains of the BIER domain. For example, the PE network device PE 1 may process (e.g., parse and/or read) the configuration information (or different configuration information included in the PE network device PE 1) to identify the BIER sub-domain information. The BIER sub-domain information may indicate the BIER sub-domain, and may also indicate a set of the BIER sub-domain (e.g., when the BIER sub-domain includes one or more sets). For example, the BIER sub-domain information may include an identifier associated with the BIER sub-domain (sub-domain-ID), and may also include an identifier associated with the set (set-ID).

As shown by reference number 106, the PE network device PE 1 may determine an RD that is associated with the BIER domain. The RD may be, for example, a universally unique identifier (UUID), or another type of identifier, and may be uniquely associated with the BIER domain. That is, the RD may only be used by the PE network device PE 1 (as well as other network devices associated with the BIER domain or other BIER domains) in association with the BIER domain. In this way, the RD may identify and/or indicate the BIER domain (e.g., when included in an advertisement, as described herein).

As shown by reference number 108, the PE network device PE 1 may identify proxy information that is associated with the BIER sub-domain. The proxy information may indicate one or more BFR-IDs of one or more BFRs in the BIER sub-domain (and, in some implementations, in the set of the BIER sub-domain). For example, the PE network device PE 1 may process (e.g., parse and/or read) configuration information (e.g., as part of identifying the BIER sub-domain information, or a separate processing step) included in the PE network device PE 1 to identify the proxy information. Additionally, or alternatively, the PE network device PE 1 may process (e.g., parse and/or read) a BIFT maintained by the PE network device PE 1 that is associated with the BIER domain and the BIER sub-domain (and, in some implementations, the set of the BIER sub-domain). For example, the PE network device PE 1 may identify one or more entries in the BIFT that indicates BFRs of the BIER sub-domain (and, in some implementations, the set of the BIER sub-domain). Accordingly, the PE network device PE 1 may determine, based on the one or more entries, the one or more BFR-IDs of the one or more BFRs.

Figure 1B:
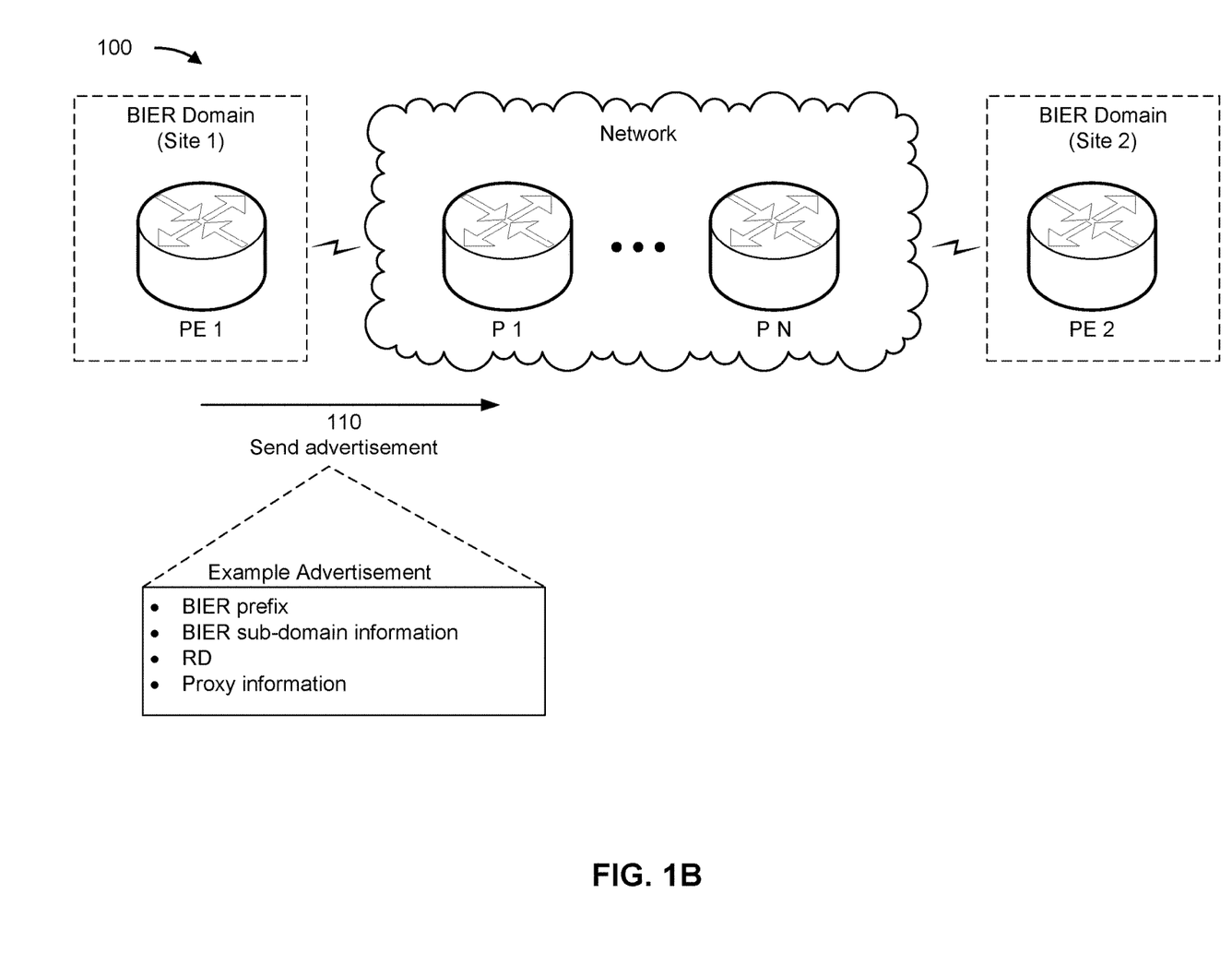

As shown in FIG. 1B, and by reference number 110, the PE network device PE 1 may send an advertisement to the network. For example, the PE network device PE 1 may send the advertisement to the P network device P 1 (and/or one or more other P network devices of the network).

As shown in FIG. 1B, the advertisement may include the BIER prefix (e.g., of the PE network device PE 1), the BIER sub-domain information (e.g., associated with the BIER sub-domain of the BIER domain), the RD (e.g., associated with the BIER domain), the proxy information (e.g., associated with the BIER sub-domain), and/or other information. For example, the advertisement may include a type-length-value (TLV) element and a sub-TLV element. The TLV element may include the BIER prefix of the network device and the BIER sub-domain information, and the sub-TLV element may include the RD and the proxy information. In some implementations, the RD may uniquely identify the BIER domain (e.g., to one or more other network devices that receives the advertisement). Additionally, or alternatively, the BIER sub-domain information and the RD may uniquely identify the BIER sub-domain (e.g., to one or more other network devices that receive the advertisement). For example, when the BIER sub-domain information includes the sub-domain-ID (e.g., the identifier associated with the BIER sub-domain), a sub-domain-ID, RD tuple may indicate the BIER sub-domain.

Figure 1C:
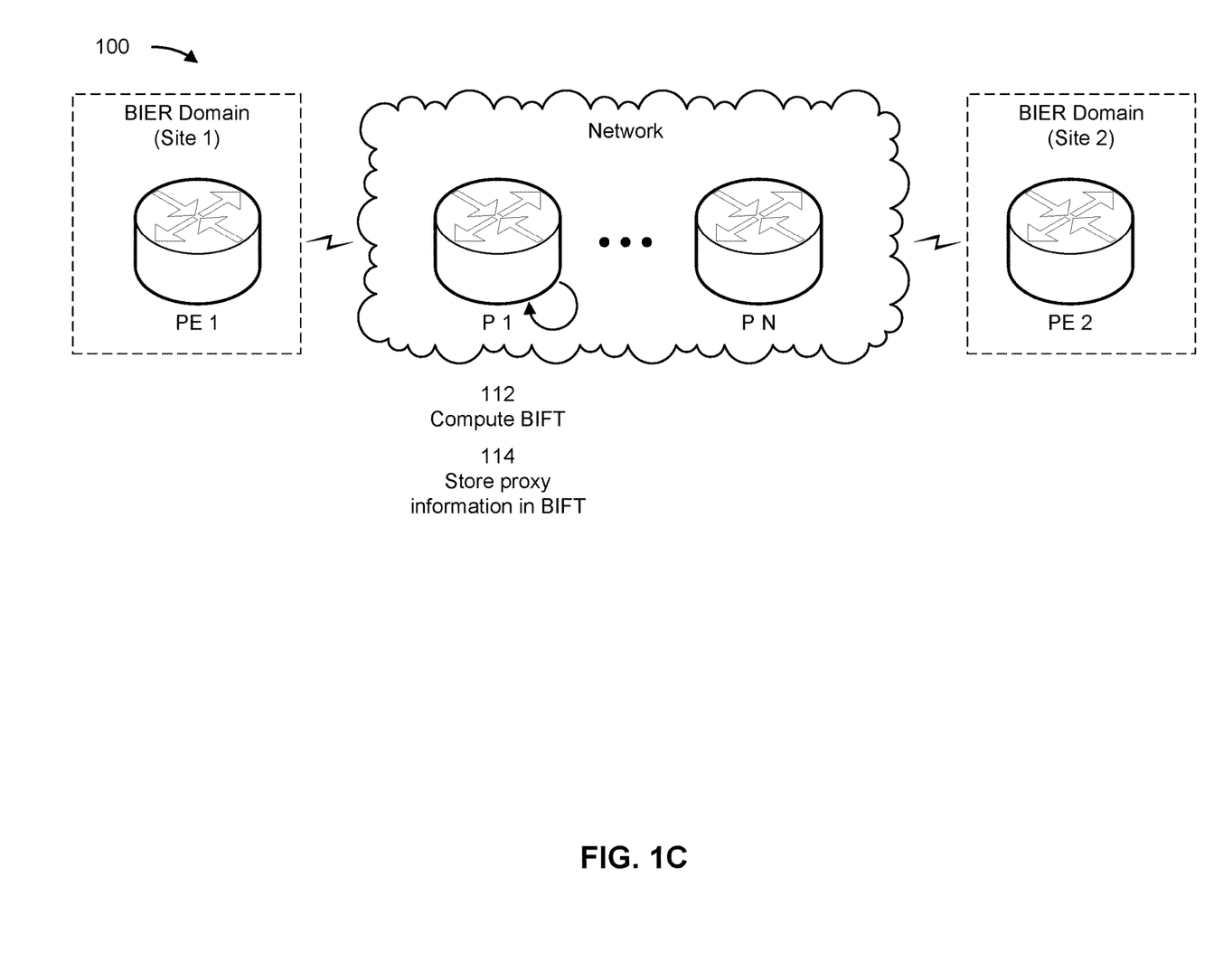

As shown in FIG. 1C, and by reference number 112, the P network device P 1 may compute a BIFT for the BIER sub-domain (e.g., based on receiving the advertisement). For example, the P network device P 1 may process (e.g., parse and/or read) the advertisement to identify the BIER prefix (e.g., of the PE network device PE 1), the BIER sub-domain information (e.g., associated with the BIER sub-domain of the BIER domain), the RD (e.g., associated with the BIER domain), the proxy information (e.g., associated with the BIER sub-domain), and/or the other information. In some implementations, the P network device P 1 may identify the BIER domain based on the RD (e.g., because the RD is associated with the BIER domain). Additionally, or alternatively, the P network device P 1 may identify the BIER sub-domain based on the BIER sub-domain information and the RD (e.g., because the BIER sub-domain information and the RD are associated with the BIER sub-domain). Accordingly, the P network device P 1 may compute the BIFT based on the RD and the BIER sub-domain.

For example, the P network device P 1 may identify, when the BIER sub-domain information includes the sub-domain-ID (e.g., the identifier associated with the BIER sub-domain), the sub-domain-ID, RD tuple associated with the BIER sub-domain. Accordingly, the P network device P 1 may generate a BIFT (e.g., for the BIER sub-domain), which is associated with the BIER sub-domain information and the RD (e.g., associated with the sub-domain-ID, RD tuple). Alternatively, the P network device P 1 may identify a BIFT that is associated with the BIER sub-domain information and the RD (e.g., that is associated with the sub-domain-ID, RD tuple) from a plurality of BIFTs included in the P network device P 1.

Accordingly, as shown by reference number 114, the P network device P 1 may store the proxy information in the BFT information. For example, the P network device P 1 may store each BFR-ID, of the one or more BFR-IDs indicated in the proxy information, in an entry of the BFT.

Figure 1D:
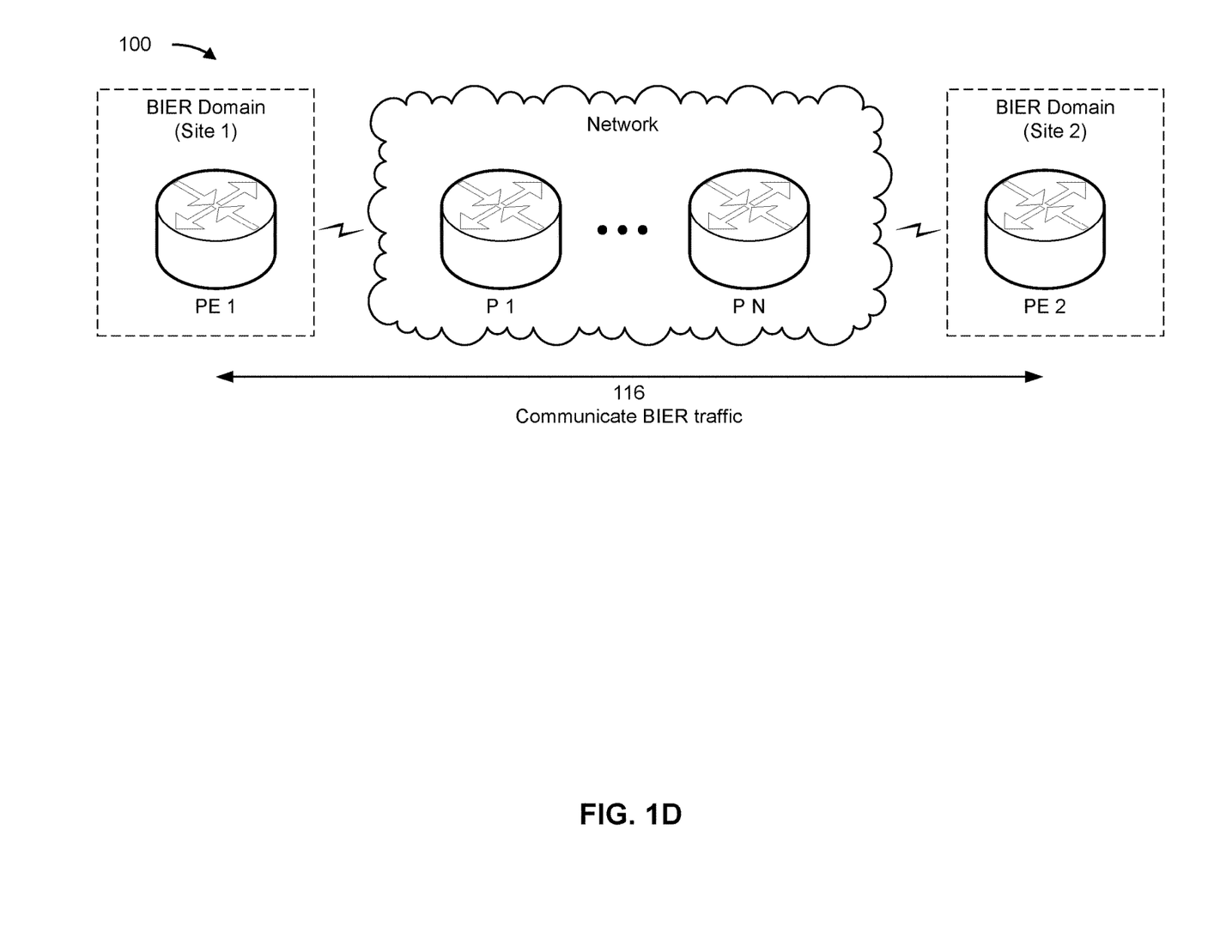

As shown in FIG. 1D, and by reference number 116, the plurality of PE network devices may communicate BIER traffic. For example, the PE network device PE 1 and the PE network device PE 2 may communicate BIER traffic via the network (e.g., via the one or more P network devices of the network). In some implementations, the plurality of PE network devices may communicate BIER VPN traffic (e.g., because the BIER domain is associated with a VPN). Each P network device may compute a BIFT (as described herein) that enables the plurality of PE network devices to communicate BIER traffic (or BIER VPN traffic) over the network.

As indicated above, FIGS. 1A-1D are provided merely as one or more examples. Other examples may differ from what is described with regard to FIGS. 1A-1D.

Figure 2:
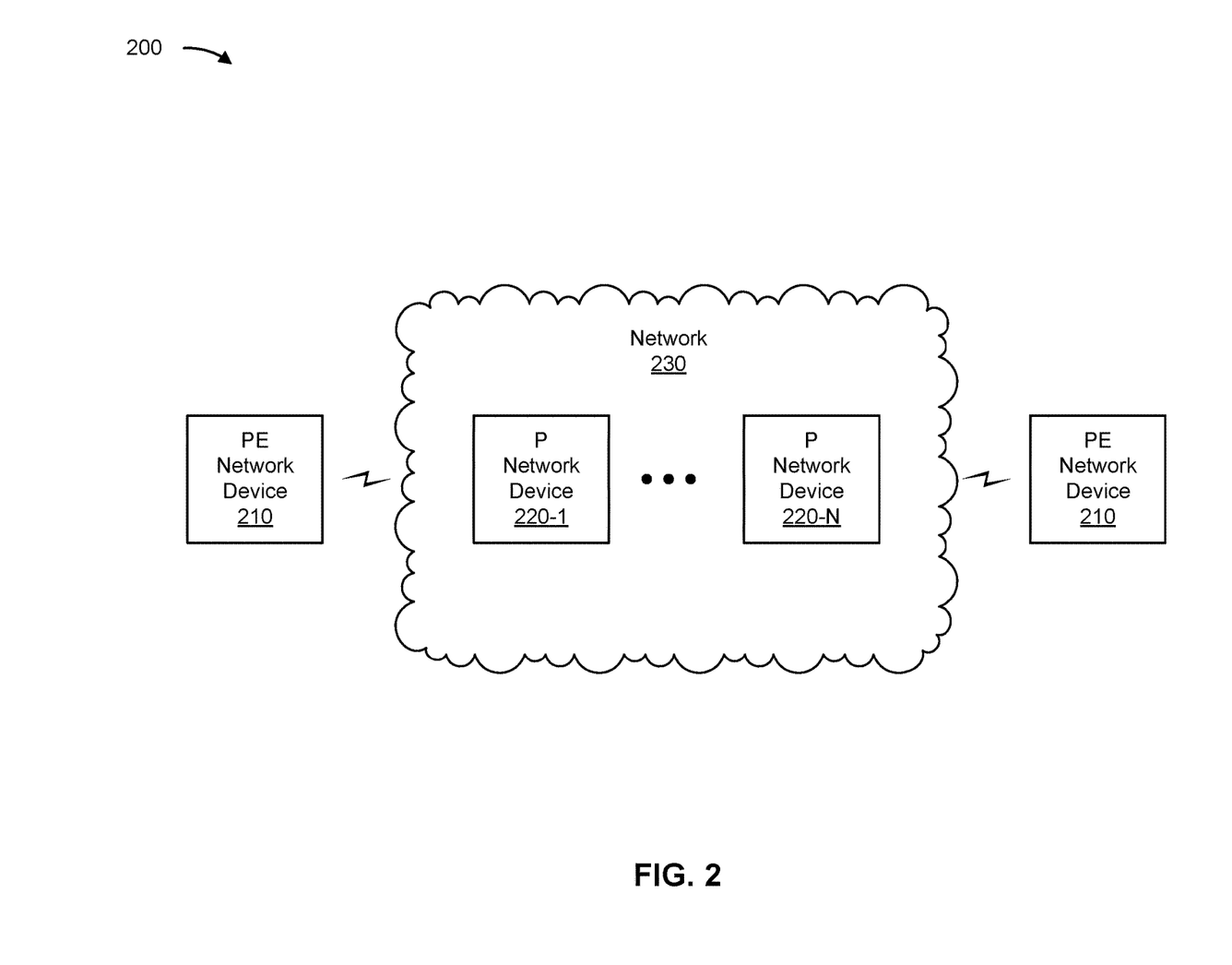
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include PE network devices 210, a plurality of P network devices 220 (shown as P network devices 220-1 through 220-N), and a network 230. Devices of environment 200 may interconnect via wired connections, wireless connections, or a combination of wired and wireless connections.

A PE network device 210 includes one or more devices capable of generating, sending, receiving, processing, storing, routing, and/or providing traffic (e.g., BIER traffic and/or BIER VPN traffic) in a manner described herein. For example, a PE network device 210 may include a firewall, a gateway, a switch, a hub, a bridge, a reverse proxy, a server (e.g., a proxy server), a security device, an intrusion detection device, a load balancer, or a similar type of device. Additionally, or alternatively, a PE network device 210 may include a router, such as a label switching router (LSR), a label edge router (LER), an ingress router, an egress router, a provider router (e.g., a provider edge router or a provider core router), a virtual router, or another type of router. In some implementations, a PE network device 210 may include a mobile phone (e.g., a smart phone or a radiotelephone), a laptop computer, a tablet computer, a desktop computer, a handheld computer, or a similar type of device. A PE network device 210 may be connected to a P network device 220 via a link (e.g., an uplink) of the P network device 220. In some implementations, a PE network device 210 may transmit traffic to a P network device 220 and receive traffic from the P network device 220, as described elsewhere herein. A PE network device 210 may be a physical device implemented within a housing, such as a chassis. In some implementations, a PE network device 210 may be a virtual device implemented by one or more computer devices of a cloud computing environment or a data center. A PE network device 210 may participate in a BIER domain, one or more BIER sub-domains of the BIER domain, and/or one or more sets of the BIER sub-domain. The PE network device 210 may send an advertisement to a P network device 220, as descried herein.

A P network device 220 includes one or more devices capable of receiving, processing, storing, routing, and/or providing traffic (e.g., BIER traffic and/or BIER VPN traffic)

in a manner described herein. For example, a P network device 220 may include a firewall, a gateway, a switch, a hub, a bridge, a reverse proxy, a server (e.g., a proxy server), a security device, an intrusion detection device, a load balancer, or a similar type of device. Additionally, or alternatively, a P network device 220 may include a router, such as an LSR, an LER, an ingress router, an egress router, a provider router (e.g., a provider edge router or a provider core router), a virtual router, or another type of router. In some implementations, a P network device 220 may include a link that connects the P network device 220 to a PE network device 210. In some implementations, the P network device 220 may transmit traffic between the PE network device 210 and the network 230, as described elsewhere herein. A P network device 220 may be a physical device implemented within a housing, such as a chassis. In some implementations, a P network device 220 may be a virtual device implemented by one or more computer devices of a cloud computing environment or a data center. A P network device 220 may receive an advertisement from a PE network device 210, as described herein.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. The network 230 may be a provider network, and a BIER domain (e.g., that is associated with a PE network device 210) may be a customer BIER domain associated with the provider network.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
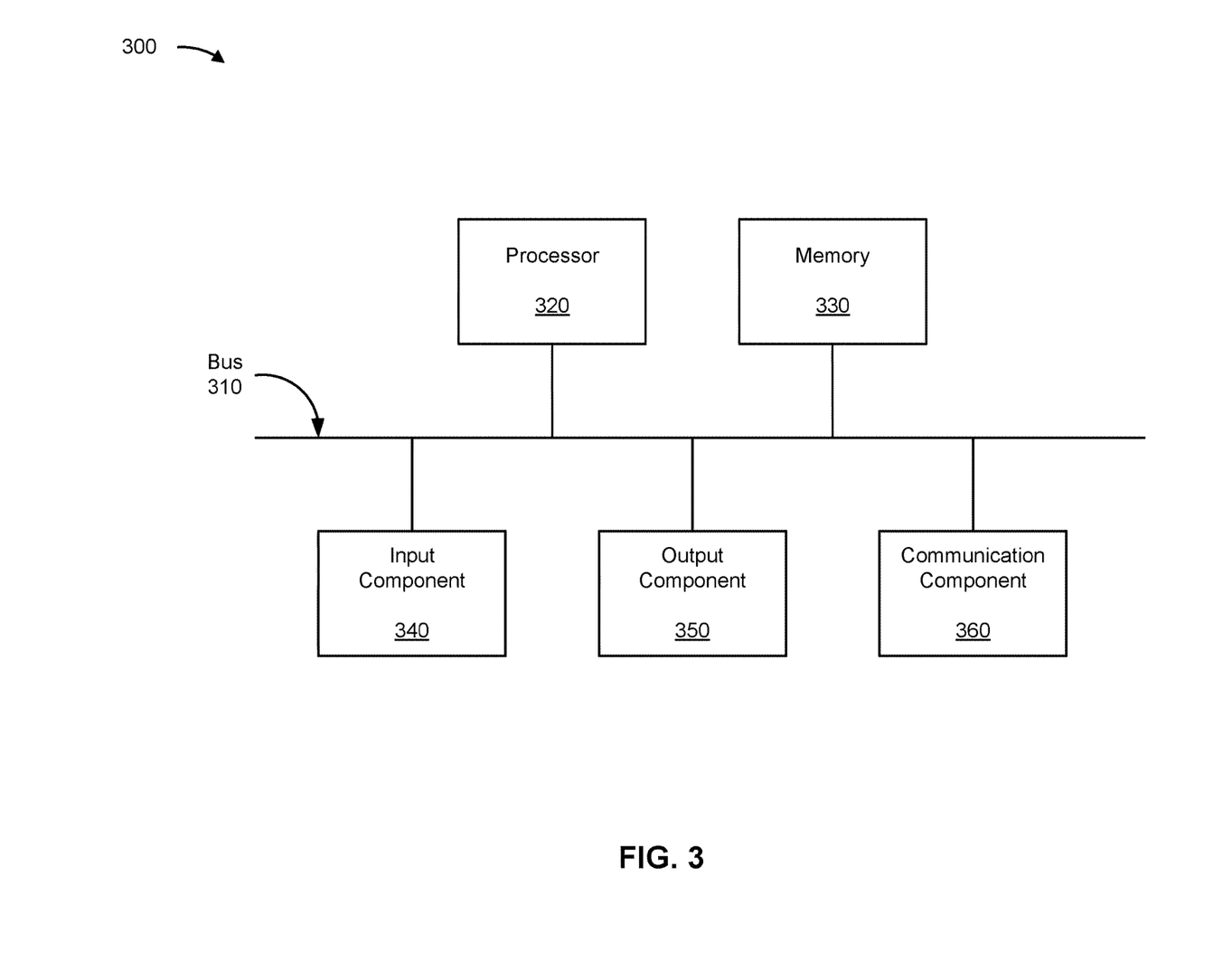
FIG. 3 is a diagram of example components of a device associated with BIER advertising with an RD.

FIG. 3 is a diagram of example components of a device 300 associated with BIER advertising with an RD. The device 300 may correspond to the PE network device 210 and/or the P network device 220. In some implementations, the PE network device 210 and/or the P network device 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
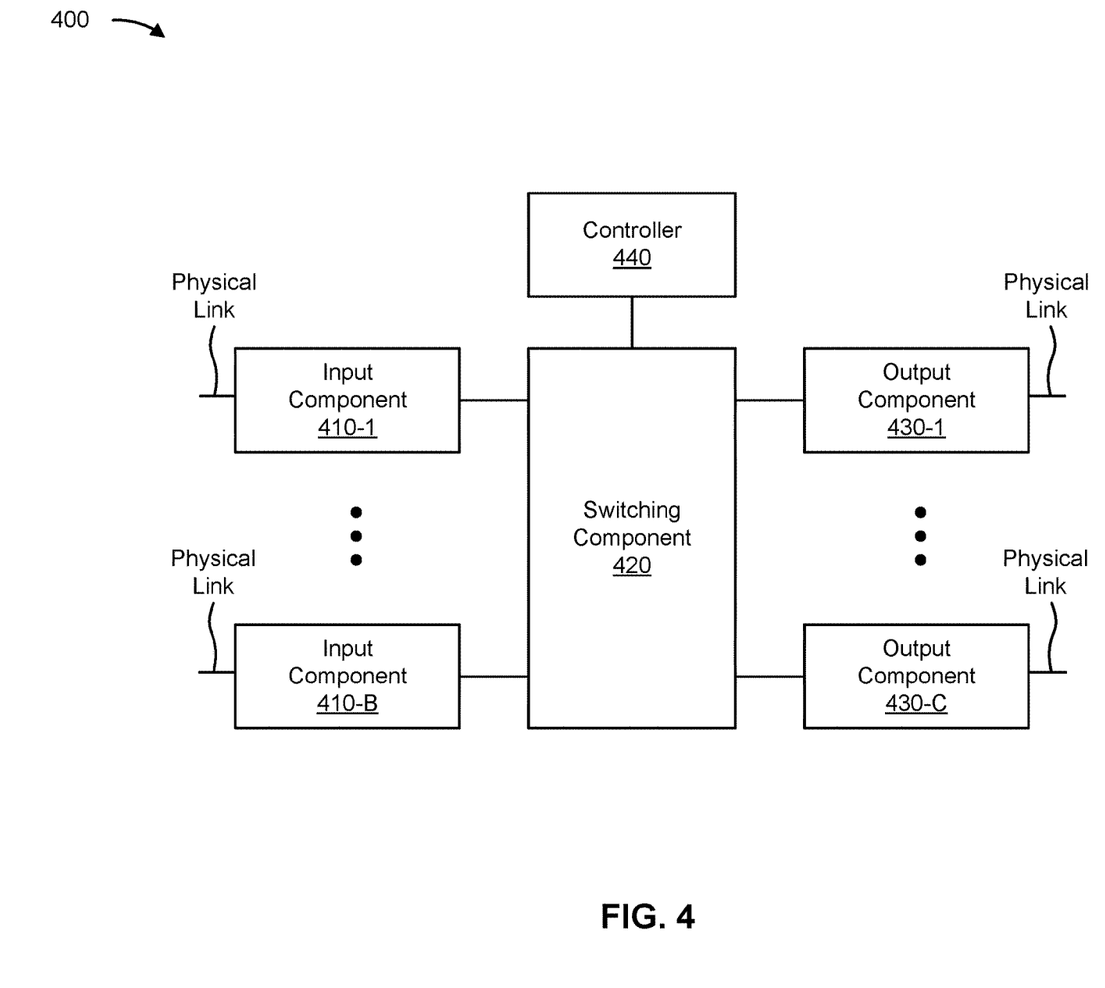
FIG. 4 is a diagram of example components of a device associated with BIER advertising with an RD.

FIG. 4 is a diagram of example components of a device 400 associated with BIER advertising with an RD. Device 400 may correspond to the PE network device 210 and/or the P network device 220. In some implementations, the PE network device 210 and/or the P network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
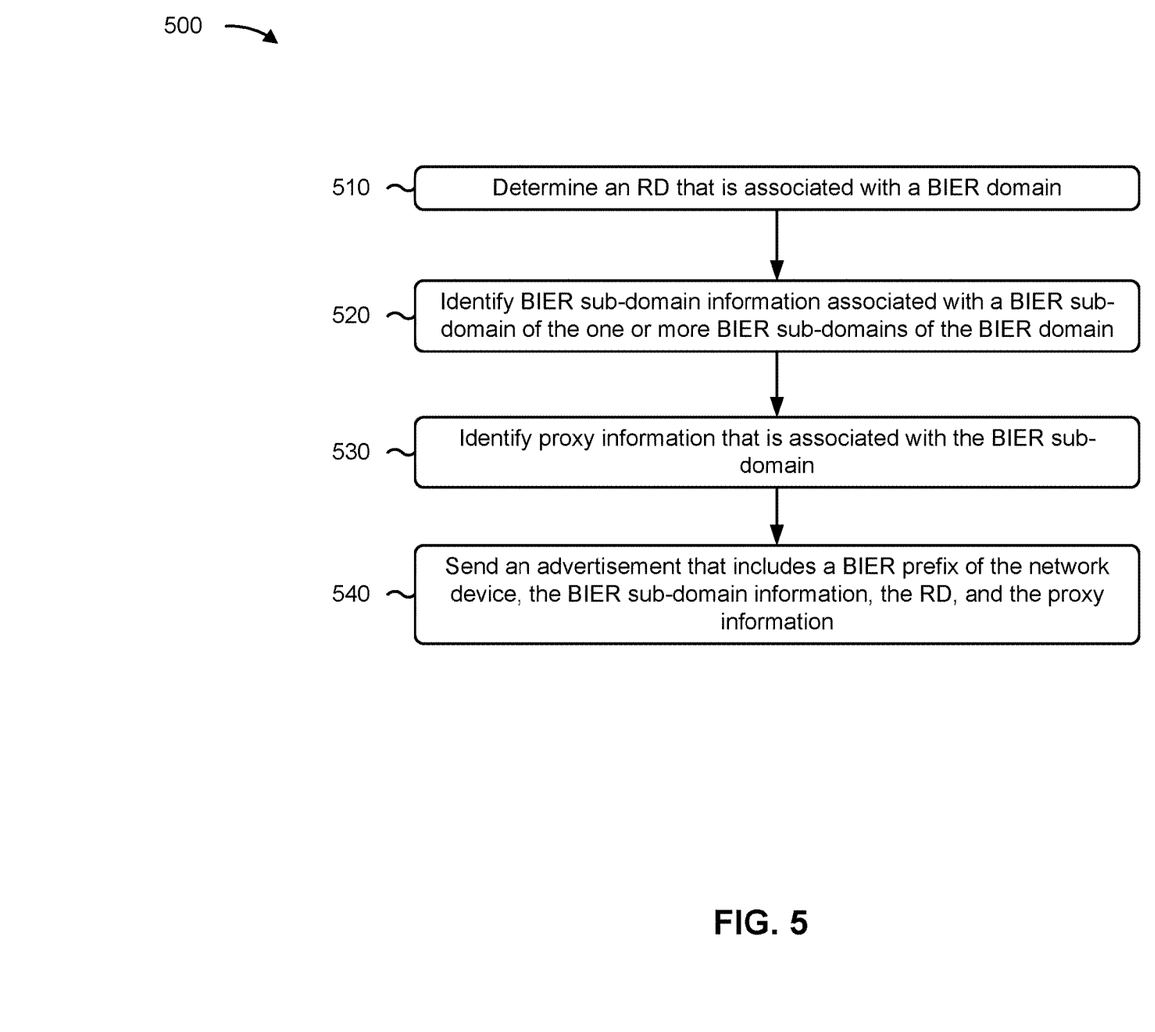
FIG. 5 is a flowchart of an example process associated with BIER advertising with an RD.

FIG. 5 is a flowchart of an example process 500 associated with BIER advertising with an RD. In some implementations, one or more process blocks of FIG. 5 are performed by a network device (e.g., a PE network device 210). In some implementations, one or more process blocks of FIG. 5 are performed by another device or a group of devices separate from or including the first network device, such as one or more other network devices (e.g., a P network device 220 and/or another PE network device 210). Additionally, or alternatively, one or more process blocks of FIG. 5 may be performed by one or more components of the device 300, such as the processor 320, the memory 330, the input component 340, the output component 350, and/or the communication component 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include determining an RD that is associated with a BIER domain (block 510). For example, the network device may determine an RD that is associated with a BIER domain, as described above. In some implementations, the network device participates in the BIER domain and one or more BIER sub-domains of the BIER domain.

As further shown in FIG. 5, process 500 may include identifying BIER sub-domain information associated with a BIER sub-domain of the one or more BIER sub-domains of the BIER domain (block 520). For example, the network device may identify BIER sub-domain information associated with a BIER sub-domain of the one or more BIER sub-domains of the BIER domain, as described above.

As further shown in FIG. 5, process 500 may include identifying proxy information that is associated with the BIER sub-domain (block 530). For example, the network device may identify proxy information that is associated with the BIER sub-domain, as described above.

As further shown in FIG. 5, process 500 may include sending an advertisement that includes a BIER prefix of the network device, the BIER sub-domain information, the RD, and the proxy information (block 540). For example, the network device may send an advertisement that includes a BIER prefix of the network device, the BIER sub-domain information, the RD, and the proxy information, as described above.

Process 500 may include additional implementations, such as any single implementation or any combination of implementations described below and/or in connection with one or more other processes described elsewhere herein.

In a first implementation, the BIER domain is associated with a VPN.

In a second implementation, alone or in combination with the first implementation, the BIER sub-domain information includes an identifier associated with the BIER sub-domain (sub-domain-ID), wherein a sub-domain-ID, RD tuple uniquely identifies the BIER sub-domain to other network devices that receive the advertisement.

In a third implementation, alone or in combination with one or more of the first and second implementations, sending the advertisement is to permit a receiving network device compute a BIFT for the BIER sub-domain (e.g., to store the proxy information in a BIFT of the receiving network device).

In a fourth implementation, alone or in combination with one or more of the first through third implementations, the BIFT of the receiving network device is associated with the RD and the BIER sub-domain information.

In a fifth implementation, alone or in combination with one or more of the first through fourth implementations, the BIER sub-domain information indicates the BIER sub-domain, and a set of the BIER sub-domain.

In a sixth implementation, alone or in combination with one or more of the first through fifth implementations, the proxy information indicates BFR-IDs of one or more BFRs in the BIER sub-domain.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
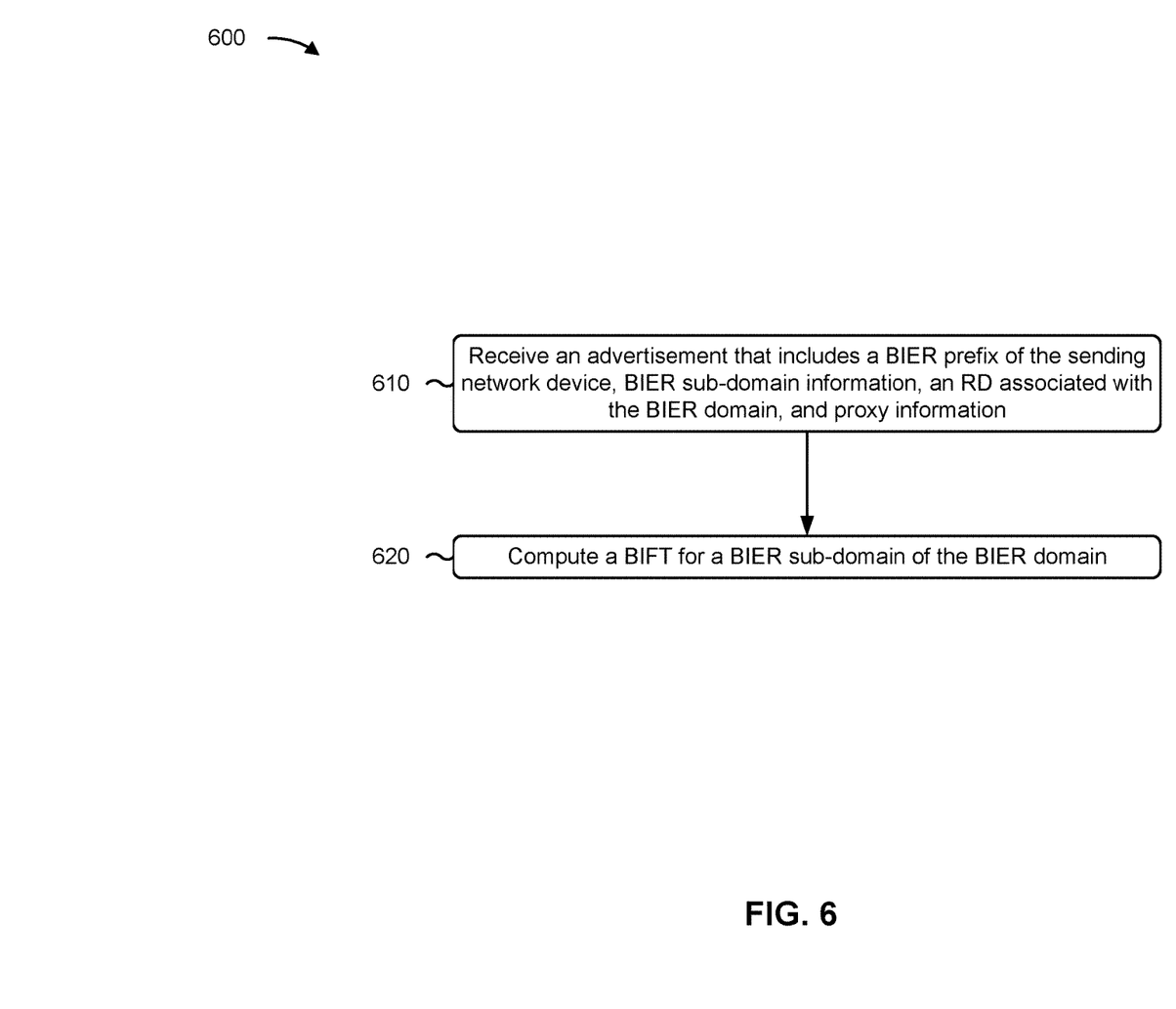
FIG. 6 is a flowchart of an example process associated with BIER advertising with an RD.

FIG. 6 is a flowchart of an example process 600 associated with BIER advertising with an RD. In some implementations, one or more process blocks of FIG. 6 are performed by a network device (e.g., a P network device 220). In some implementations, one or more process blocks of FIG. 6 are performed by another device or a group of devices separate from or including the first network device, such as one or more other network devices (e.g., another P network device 220 and/or a PE network device 210). Additionally, or alternatively, one or more process blocks of FIG. 6 may be performed by one or more components of the device 300, such as the processor 320, the memory 330, the input component 340, the output component 350, and/or the communication component 360. Additionally, or alternatively, one or more process blocks of FIG. 6 may be performed by one or more components of the device 400, such as the input component 410, the switching component 420, the output component 430, and/or the controller 440.

As shown in FIG. 6, process 600 may include receiving, from a sending network device associated with BIER domain, an advertisement that includes a BIER prefix of the sending network device, BIER sub-domain information, an RD associated with the BIER domain, and proxy information (block 610). For example, the network device may receive, from a sending network device associated with a BIER domain, an advertisement that includes a BIER prefix of the sending network device, BIER sub-domain information, an RD associated with the BIER domain, and proxy information, as described above.

As further shown in FIG. 6, process 600 may include computing a BIFT for a BIER sub-domain of the BIER domain (block 620). For example, the network device may compute a BIFT for a BIER sub-domain of the BIER domain, as described above.

Process 600 may include additional implementations, such as any single implementation or any combination of implementations described below and/or in connection with one or more other processes described elsewhere herein.

In a first implementation, the BIER domain is associated with a VPN.

In a second implementation, alone or in combination with the first implementation, the BIER sub-domain information includes an identifier associated with the BIER sub-domain (sub-domain-ID), wherein a sub-domain-ID, RD tuple uniquely identifies the BIER sub-domain to the network device.

In a third implementation, alone or in combination with one or more of the first and second implementations, computing the BIFT for the BIER sub-domain comprises identifying, based on the RD and the BIER sub-domain information, the BIFT from a plurality of BIFTs included in the network device, and storing, in the BIFT, the proxy information (e.g., storing one entry for each BFR-ID in the proxy information).

In a fourth implementation, alone or in combination with one or more of the first through third implementations, the BIFT is associated with the RD and the BIER sub-domain information.

In a fifth implementation, alone or in combination with one or more of the first through fourth implementations, the BIER sub-domain information indicates the BIER sub-domain, and a set of the BIER sub-domain.

In a sixth implementation, alone or in combination with one or more of the first through fifth implementations, the proxy information indicates BFR-IDs of one or more BFRs in the BIER sub-domain.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. "Packet" may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    determining, by a network device, a route distinguisher (RD) that is uniquely associated with a bit index explicit replication (BIER) virtual private network (VPN) domain,
        wherein the network device participates in the BIER VPN domain and one or more BIER sub-domains of the BIER VPN domain;
    identifying, by the network device, BIER sub-domain information associated with a BIER sub-domain of the one or more BIER sub-domains of the BIER VPN domain;
    identifying, by the network device, proxy information that is associated with the BIER sub-domain; and
    sending, by the network device, an advertisement that includes a BIER prefix of the network device, the BIER sub-domain information, the RD, and the proxy information.

2. The method of claim 1, wherein the BIER sub-domain information includes a sub-domain identifier (sub-domain-ID) associated with the BIER sub-domain,
    wherein the sub-domain-ID, RD tuple uniquely identifies the BIER sub-domain to other network devices that receive the advertisement.

3. The method of claim 1, wherein sending the advertisement is to permit a receiving network device to compute a bit index forwarding table (BIFT) for the BIER sub-domain.

4. The method of claim 3, wherein the BIFT of the receiving network device is associated with the RD and the BIER sub-domain information.

5. The method of claim 1, wherein the BIER sub-domain information indicates:
    the BIER sub-domain.

6. The method of claim 1, wherein the proxy information indicates:
    BFR identifiers (BFR-IDs) of one or more BFRs in the BIER sub-domain.

7. The method of claim 1, wherein the RD is a universally unique identifier associated with the BIER VPN domain.

8. A method, comprising:
    receiving, by a network device and from a sending network device associated with a bit index explicit replication (BIER) virtual private network (VPN) domain, an advertisement that includes a BIER prefix of the sending network device, BIER sub-domain information associated with a BIER sub-domain of one or more BIER sub-domains of the BIER VPN domain, a route distinguisher (RD) that is uniquely associated with the BIER VPN domain, and proxy information; and
    computing, by the network device, a bit index forwarding table (BIFT) for the BIER sub-domain of the one or more BIER sub-domains of the BIER VPN domain.

9. The method of claim 8, wherein the BIER sub-domain information includes a sub-domain identifier (sub-domain-ID) associated with the BIER sub-domain,
    wherein the sub-domain-ID, RD tuple uniquely identifies the BIER sub-domain to the network device.

10. The method of claim 8, wherein computing the BIFT for the BIER sub-domain comprises:
    identifying, based on the RD and the BIER sub-domain information, the BIFT from a plurality of BIFTs included in the network device; and
    storing, in the BIFT, one entry for each BFR identifier (BFR-ID) in the proxy information.

11. The method of claim 8, wherein the BIFT is associated with the RD and the BIER sub-domain information.

12. The method of claim 8, wherein the BIER sub-domain information indicates:
    the BIER sub-domain.

13. The method of claim 8, wherein the proxy information indicates:

BFR identifiers (BFR-IDs) of one or more BFRs in the BIER sub-domain.

14. The method of claim 8, wherein the RD is a universally unique identifier associated with the BIER VPN domain.

15. A network device, comprising:
one or more memories; and
one or more processors to:
receive, from a sending network device associated with a bit index explicit replication (BIER) domain virtual private network (VPN), an advertisement that includes BIER sub-domain information associated with a BIER sub-domain of one or more BIER sub-domains of the BIER VPN domain, a route distinguisher (RD) that is uniquely associated with the BIER VPN domain, and proxy information that is associated with the BIER sub-domain; and
compute a bit index forwarding table (BIFT) for the BIER sub-domain of the one or more BIER sub-domains of the BIER VPN domain.

16. The network device of claim 15, wherein the BIER sub-domain information includes sub-domain identifier (sub-domain-ID) associated with the BIER sub-domain (sub-domain-ID),
wherein the sub-domain-ID, RD tuple uniquely identifies the BIER sub-domain to the network device.

17. The network device of claim 15, wherein computing the BIFT for the BIER sub-domain comprises:
storing, in the BIFT, the proxy information.

18. The network device of claim 17, wherein the BIFT is associated with the RD and the BIER sub-domain information.

19. The network device of claim 15, wherein the proxy information indicates:
BFR identifiers (BFR-IDs) of one or more BFRs in the BIER sub-domain.

20. The network device of claim 15, wherein the RD is a universally unique identifier associated with the BIER VPN domain.

* * * * *